United States Patent
Kuang

(10) Patent No.: US 10,252,934 B2
(45) Date of Patent: Apr. 9, 2019

(54) OPTICAL GLASS, GLASS PREFORM AND OPTICAL ELEMENT

(71) Applicant: CDGM GLASS CO., LTD, Chengdu, Sichuan (CN)

(72) Inventor: Bo Kuang, Chengdu (CN)

(73) Assignee: CDGM GLASS CO., LTD, Chengdu (CN)

(*) Notice: Subject to any disclaimer, the term of this patent is extended or adjusted under 35 U.S.C. 154(b) by 0 days.

(21) Appl. No.: 15/676,542

(22) Filed: Aug. 14, 2017

(65) Prior Publication Data

US 2018/0086659 A1 Mar. 29, 2018

(30) Foreign Application Priority Data

Sep. 29, 2016 (CN) .......................... 2016 1 08614706

(51) Int. Cl.
*C03C 3/068* (2006.01)
*G02B 13/00* (2006.01)

(52) U.S. Cl.
CPC ............ *C03C 3/068* (2013.01); *G02B 13/001* (2013.01)

(58) Field of Classification Search
CPC .......... C03C 3/064; C03C 3/066; C03C 3/068
See application file for complete search history.

(56) References Cited

FOREIGN PATENT DOCUMENTS

| CN | 1876589 A | | 12/2006 |
|---|---|---|---|
| JP | 2013209232 A | * | 10/2013 |
| JP | 2014076941 A | * | 5/2014 |
| JP | 2014162707 A | * | 9/2014 |

* cited by examiner

*Primary Examiner* — Elizabeth A. Bolden
(74) *Attorney, Agent, or Firm* — Oliff PLC

(57) ABSTRACT

A high-refraction low-dispersion optical glass with refractive index of 1.77-1.85 and Abbe number of 40-48, includes the following components by mole percentage: 5-25% of $SiO_2$, 15-45% of $B_2O_3$, 5-25% of $La_2O_3$, 1-20% of $Gd_2O_3$, 0-10% of $Y_2O_3$, 0-8% of $TiO_2$, 0-8% of $Ta_2O_5$, more than 0 but less than or equal to 8% of $Nb_2O_5$, more than 0 but less than or equal to 15% of $ZrO_2$, 18-40% of ZnO and 0.28-1.2 of $SiO_2/B_2O_3$. The invention reduces the content of $Ta_2O_5$ and optimizes the cost of raw materials. Through rational composition design, the optical glass of the invention is conducive to precision molding while achieving the required optical constant, with excellent chemical stability. A glass preform and an optical element made of the optical glass are also disclosed.

19 Claims, No Drawings

OPTICAL GLASS, GLASS PREFORM AND OPTICAL ELEMENT

TECHNICAL FIELD

The present invention relates to a high-refractivity and low-dispersion optical glass, in particular to a high-refractivity and low-dispersion optical glass and optical element.

BACKGROUND

In recent years, with the rapid development of digitization and high precision of the optical system, in the optical equipment such as digital camera, video camera and other photographic equipment as well as optical equipment such as projector and projection television, higher and higher requirements are imposed on overall lightweight and miniaturization of optical system for reducing the number of optical elements like lens and prism therein. In the design of the optical system, the extensive use of high-refractivity glass or the use of non-spherical lens is applied to achieve miniaturization, ultra-thin and wide-angle, to realize lightweight and high-performance of optical system while easier to achieve color correction, thus high-refractivity low-dispersion glass research and development needs are gradually increased.

Early production of high-refractivity low-dispersion glass contains a large amount of $Ta_2O_5$. For example, CN1876589A discloses an optical glass with refractive index of 1.75-1.85 and Abbe number of 34-44, which contains more than 15% but less than 35% of $Ta_2O_5$. Tantalum is a scarce metal, and the use of $Ta_2O_5$ is extremely unfavorable for the product cost control, so the research and development objective of optical glass works is to reduce or not use $Ta_2O_5$ in the high-refractivity low-dispersion glass composition.

SUMMARY

A technical problem to be solved by the present invention is to provide a high-refractivity low-dispersion optical glass with low material cost, refractive index of 1.77-1.85 and Abbe number of 40-48.

The present invention also provides a glass preform and an optical element made of the above optical glass.

To solve the technical problem, the technical scheme of the present invention provides: an optical glass, comprising the following components by mole percentage: 5-25% of $SiO_2$, 15-45% of $B_2O_3$, 5-25% of $La_2O_3$, 1-20% of $Gd_2O_3$, 0-10% of $Y_2O_3$, 0-8% of $TiO_2$, 0-8% of $Ta_2O_5$, more than 0 but less than or equal to 8% of $Nb_2O_5$, more than 0 but less than or equal to 15% of $ZrO_2$, 18-40% of ZnO, and 0.28-1.2 of $SiO_2/B_2O_3$.

Furthermore, it comprises: 0-10% of $WO_3$ and 0-8% of $Li_2O$.

Furthermore, it further comprises the following components by mole percentage: 0-10% of $Al_2O_3$, 0-10% of $Yb_2O_3$, 0-10% of $Na_2O$, 0-10% of $K_2O$, 0-1% of $Sb_2O_3$, and 0-10% of RO (in which RO is one or more of MgO, CaO, SrO or BaO).

An optical glass, comprising the following components by mole percentage: 5-25% of $SiO_2$, 15-45% of $B_2O_3$, 5-25% of $La_2O_3$, 1-20% of $Gd_2O_3$, 0-10% of $Y_2O_3$, 0-8% of $TiO_2$, 0-8% of $Ta_2O_5$, more than 0 but less than or equal to 8% of $Nb_2O_5$, more than 0 but less than or equal to 15% of $ZrO_2$, 18-40% of ZnO, 0-10% of $WO_3$, 0-8% of $Li_2O$, 0-10% of $Al_2O_3$, 0-10% of $Yb_2O_3$, 0-10% of $Na_2O$, 0-10% of $K_2O$, 0-1% of $Sb_2O_3$, 0.28-1.2 of $SiO_2/B_2O_3$ and 0-10% of RO (in which RO is one or more of MgO, CaO, SrO or BaO).

Furthermore, the content of said each component satisfies one or more of the following 7 conditions:

| | |
|---|---|
| $SiO_2/B_2O_3$ is 0.3-1; | 1) |
| $Nb_2O_5/Gd_2O_3$ is 0.01-1; | 2) |
| $Ta_2O_5/Nb_2O_5$ is 1; | 3) |
| $ZnO/B_2O_3$ is 0.5-2; | 4) |
| $TiO_2/(TiO_2+Nb_2O_5)$ is 0.1-0.9; | 5) |
| $Gd_2O_3/(La_2O_3+Gd_2O_3+Y_2O_3)$ is 0.15-0.6; | 6) |
| $4 \times ZrO_2/(ZnO+Li_2O)$ is 0.3-1.6. | 7) |

Furthermore, it comprises: 8-23% of $SiO_2$, and/or 20-42% of $B_2O_3$, and/or 5-20% of $La_2O_3$, and/or 2-15% of $Gd_2O_3$, and/or 0.1-8% of $Y_2O_3$, and/or 0.1-6% of $TiO_2$, and/or 0-5% of $Ta_2O_5$, and/or 0.1-6% of $Nb_2O_5$, and/or 1-10% of $ZrO_2$, and/or 20-38% of ZnO, and/or 0-5% of $WO_3$, and/or 0-5% of $Li_2O$.

Furthermore, it comprises: 0-5% of $Al_2O_3$, and/or 0-5% of $Yb_2O_3$, and/or 0-5% of $Na_2O$, and/or 0-5% of $K_2O$, and/or 0-0.5% of $Sb_2O_3$, and/or 0-5% of RO (in which RO is one or more of MgO, CaO, SrO or BaO).

Furthermore, it comprises: 9-20% of $SiO_2$, and/or 23-38% of $B_2O_3$, and/or 6-15% of $La_2O_3$, and/or 2-10% of $Gd_2O_3$, and/or 0.5-5% of $Y_2O_3$, and/or 0.1-4% of $TiO_2$, and/or 0-3% of $Ta_2O_5$, and/or 0.1-4% of $Nb_2O_5$, and/or 2-8% of $ZrO_2$, and/or 23-35% of ZnO.

Furthermore, the content of said each component satisfies one or more of the following 7 conditions:

| | |
|---|---|
| $SiO_2/B_2O_3$ is 0.3-0.7; | 1) |
| $Nb_2O_5/Gd_2O_3$ is 0.03-0.8; | 2) |
| $Ta_2O_5/Nb_2O_5$: less than 0.8; | 3) |
| $ZnO/B_2O_3$ is 0.7-1.5; | 4) |
| $TiO_2/(TiO_2+Nb_2O_5)$ is 0.2-0.8; | 5) |
| $Gd_2O_3/(La_2O_3+Gd_2O_3+Y_2O_3)$ is 0.2-0.55; | 6) |
| $4 \times ZrO_2/(ZnO+Li_2O)$ is 0.35-1.2. | 7) |

Furthermore, the content of said each component satisfies one or more of the following 7 conditions:

| | |
|---|---|
| $SiO_2/B_2O_3$ is 0.35-0.65; | 1) |
| $Nb_2O_5/Gd_2O_3$ is 0.05-0.5; | 2) |
| $Ta_2O_5/Nb_2O_5$: less than 0.5; | 3) |
| $ZnO/B_2O_3$ is 0.75-1.2; | 4) |
| $TiO_2/(TiO_2+Nb_2O_5)$ is 0.3-0.7; | 5) |
| $Gd_2O_3/(La_2O_3+Gd_2O_3+Y_2O_3)$ is 0.25-0.5; | 6) |
| $4 \times ZrO_2/(ZnO+Li_2O)$ is 0.45-1. | 7) |

Furthermore, the total content of $SiO_2$, $B_2O_3$, $La_2O_3$, $Gd_2O_3$, $Y_2O_3$, $TiO_2$, $Nb_2O_5$, $WO_3$, $ZrO_2$ and ZnO is above 95%, excluding $Ta_2O_5$.

Furthermore, the total content of $SiO_2$, $B_2O_3$, $La_2O_3$, $Gd_2O_3$, $Y_2O_3$, $TiO_2$, $Nb_2O_5$, $ZrO_2$ and ZnO is above 99%.

Furthermore, it further comprises the following components by mole percentage: 0-10% of $P_2O_5$, 0-10% of $Bi_2O_3$, 0-10% of $TeO_2$, 0-10% of $Ga_2O_3$, 0-10% of $Lu_2O_3$, 0-8% of $GeO_2$, 0-1% of $CeO_2$, 0-1% of $SnO_2$ and 0-10% of F.

Furthermore, the refractive index (nd) of the glass is 1.77-1.85, the Abbe number (vd) is 40-48, and the density ($\rho$) of the glass is below 5.00 $g/cm^3$.

Furthermore, the corresponding wave length $\lambda_{80}$ is below 410 nm when the transmittance of the optical glass reaches 80%, the corresponding wave length $\lambda_5$ is below 350 nm when the transmittance reaches 5%, the upper limit of devitrification temperature is below 1160° C., and the glass transition temperature (Tg) is below 630° C.

Furthermore, the corresponding wave length $\lambda_{80}$ is below 400 nm when the transmittance of the optical glass reaches 80%, the corresponding wave length $\lambda_5$ is below 340 nm when the transmittance reaches 5%, the upper limit of devitrification temperature is below 1150° C., the glass transition temperature (Tg) is below 620° C., and the density (p) of glass is below 4.90 $g/cm^3$.

A glass preform, made of the above-mentioned optical glass.

An optical element, made of the above optical glass.

The advantages of the present invention are as follows: reduce the content of $Ta_2O_5$ and optimize the cost of raw material; through rational composition design, the optical glass of the invention is conducive to precision molding while achieving the required optical constant, with excellent chemical stability. A glass preform and optical element made of the optical glass are also disclosed.

DETAILED DESCRIPTION

I. Optical Glass

The optical glass of the present invention reduces or does not contain expensive $Ta_2O_5$ content in consideration of reducing the cost of raw materials, to obtain a high-refractivity low-dispersion optical glass having a refractive index of 1.77-1.85 and an Abbe number of 40-48.

The composition of the optical glass according to the present invention will be described in detail below, and the content and the total content of each glass component are expressed by mole percentage unless otherwise specified. In the following description, if referred to below or above the prescribed value below, the prescribed value is included.

$B_2O_3$ is a glass network forming component having an effect of improving glass fusibility and devitrification resistance and reducing glass transition temperature and density. In order to achieve the above-mentioned effects, the present invention introduces 15% or more of $B_2O_3$, preferably introducing more than 20% of $B_2O_3$, more preferably introducing more than 23% of $B_2O_3$. However, when the introduced amount is more than 45%, the glass stability will be lowered and the refractive index will be lowered, so that the high refractive index of the present invention cannot be obtained. Therefore, the content of $B_2O_3$ is set to an upper limit of 45% in the present invention, preferably an upper limit of 42%, and more preferably an upper limit of 38%.

$SiO_2$ is also a glass forming body, which is different from the loose chain layered network formed by $B_2O_3$. $SiO_2$ forms silica-oxygen tetrahedron three-dimensional network in the glass, being very dense and solid. This network is added into the glass to reinforce the loose boron oxide triangular body [$BO_3$] network to make it dense, thereby enhancing the high temperature viscosity of the glass; at the same time, the addition of the silicon tetrahedron three-dimensional network and the improved capability of glass network isolation from devitrification cations such as La, Nb and Li increase the devitrification threshold, so that the lower limit of $SiO_2$ content in the glass of the present invention is 5%, preferably 8%, more preferably 9% when the above effect is better; but if the content of $SiO_2$ is increased without limitation, the glass transition temperature will be increased and the meltability of the glass will be lowered, so that the upper limit of the content is 25%, preferably the upper limit of 23%, further preferably the upper limit of 20%.

The present invention not only can increase the meltability of the glass raw material by controlling the ratio of $SiO_2$ content to the content of $B_2O_3$($SiO_2/B_2O_3$) within 0.28-1.2, but also can effectively increase the glass stability. When the $SiO_2/B_2O_3$ value is 0.3-1, the increase in the average linear expansion coefficient can be effectively suppressed, and the ratio is further preferably 0.3-7, more preferably 0.35-0.65.

$La_2O_3$ is an essential component for obtaining the optical properties required for the present invention. In the formulation system of the present invention, the combination of $B_2O_3$ and $La_2O_3$ can effectively improve the devitrification resistance of the glass and improve the chemical stability of the glass. When the $La_2O_3$ content is less than 5%, it is difficult to achieve the required optical properties; but when its content exceeds 25%, the glass resistance to devitrification and melting properties are deteriorated. Thus, the $La_2O_3$ content of the present invention is 5-25%, preferably in the range of 5-20%, more preferably in the range of 6-15%.

$Gd_2O_3$ can increase the refractive index of the glass, but not significantly improving the dispersion of the glass. By introducing over 1% of $Gd_2O_3$ to coexist with $La_2O_3$ in the present invention, the stability of the glass can be improved, the chemical stability of the glass can be remarkably enhanced, and the excessive rise of the Abbe number can be controlled while maintaining the refractive index. If the content exceeds 20%, the glass devitrification resistance will be reduced and the density of the glass will be increased. Therefore, the $Gd_2O_3$ content of the present invention is 1-20%, preferably in the range of 2-15%, more preferably in the range of 2-10%.

The high-refraction and low-dispersion component of the present invention is also preferably introduced into $Y_2O_3$, which suppresses the rise in the cost of the glass material while maintaining the high refractive index and high Abbe number, and improves the meltability and devitrification resistance of the glass. In addition, it can reduce the upper limit of devitrification temperature of the glass and specific gravity, but if its content exceeds 10%, the glass stability and devitrification resistance will be decreased. Thus, the $Y_2O_3$ content is in the range of 0-10%, preferably in the range of 0.1-8%, more preferably 0.5-5%.

$Yb_2O_3$ is also a component which imparts high refraction and low dispersion properties. When the introduced amount thereof is more than 10%, the anti-devitrification property of the glass will be lowered, so that the content thereof is limited to 0-10%, preferably 0-5%, further preferably not added.

In the present invention, $La_2O_3$ coexists with $Gd_2O_3$, or preferably $La_2O_3$ and $Gd_2O_3$ coexist with $Y_2O_3$, more preferably $Gd_2O_3/(La_2O_3+Gd_2O_3+Y_2O_3)$ is in the range of 0.15-0.6, further preferably $Gd_2O_3/(La_2O_3+Gd_2O_3+Y_2O_3)$ in the range of 0.2-0.55, furthermore preferably $Gd_2O_3/(La_2O_3+Gd_2O_3+Y_2O_3)$ in the range of 0.25-0.5. It is possible to overcome the undesirable effect of reducing the stability of the glass due to the reduction or non-use of $Ta_2O_5$ to obtain the high-refraction low-dispersion glass with excellent glass stability, while the glass is not easy to be colored.

In the glass of the present invention, when the content of $Nb_2O_5$ exceeds 0, it has an excellent effect in lowering the liquidus temperature, and also has the effect of improving the refractive index, the anti-devitrification property and the chemical durability without deteriorating the transmittance. By introducing appropriate amount of $Nb_2O_5$, it can effectively improve the glass anti-devitrification properties in the precision molding process. If its content exceeds 8%, the glass dispersion will be increased, so as not to achieve the optical properties of the glass in the present invention. Thus, the $Nb_2O_5$ content is in the range of greater than 0 but less than or equal to 8%, preferably in the range of 0.1-6%, more preferably 0.1-4%. The inventors of the present invention have found that when the ratio of $Nb_2O_5$ content to $Gd_2O_3$ content ($Nb_2O_5/Gd_2O_3$) in the glass of the present invention is 0.01-1, it can significantly improve the chemical durability and devitrification resistance of the glass, and in particular, when the $Nb_2O_5/Gd_2O_3$ value is 0.03-0.8, the effect is particularly conspicuous, further preferably 0.05-0.5.

$Ta_2O_5$ can improve the refractive index and devitrification resistance of the glass as well as viscosity of the molten glass, but it is expensive and is disadvantageous to the reduction of raw material costs. Therefore, its content is limited to be less than 8%, preferably less than 5%, more preferably less than 3%, further preferably less than 1%, and more preferably not added.

In the present invention, the value of $Ta_2O_5/Nb_2O_5$ is controlled to be less than 1, which can improve the anti-devitrification property of the glass while effectively adjusting the refractive index and dispersion. When the glass contains an easily colored component, the value of $Ta_2O_5/Nb_2O_5$ is preferably less than 0.8, which can effectively improve the coloring property of glass, the value of $Ta_2O_5/Nb_2O_5$ is further preferably less than 0.5, and the value of $Ta_2O_5/Nb_2O_5$ is furthermore preferably less than 0.3.

ZnO is added to the glass of the present invention system, the refractive index and dispersion of the glass can be adjusted, the anti-devitrification performance of the glass can be improved, the glass transition temperature can be reduced and the stability of the glass can be enhanced. Besides, ZnO can also reduce the high temperature viscosity of the glass, so that the glass can be smelt at lower temperatures, which can enhance the glass transmittance. In particular, when a small amount of tantalum oxide or even no tantalum oxide is contained in the glass of the present invention, it is possible to compensate for the reduction of the optical constant to a certain extent by introducing over 18% of ZnO. However, if the amount of ZnO is added too much, the glass's anti-devitrification properties will decline, while the high temperature viscosity is small, bringing challenge to molding. In the glass system of the present invention, if the content of ZnO is less than 18%, the Tg temperature cannot meet the design requirements. If the content is higher than 40%, the anti-devitrification property of the glass will decrease and the high temperature viscosity cannot meet the design requirements. Therefore, the lower limit of the ZnO content is limited to 18%, preferably with lower limit to 20%, more preferably with lower limit to 23%; the upper limit of the ZnO content is limited to 40%, preferably with upper limit to 38%, and more preferably with upper limit to 35%.

In order to obtain an easy-melting glass having a relatively low Tg temperature and good stability, the inventors of the present invention have found through a large number of experimental studies that, when the ratio of $ZnO/B_2O_3$ is in the range of 0.5-2, preferably the ratio of $ZnO/B_2O_3$ in the range of 0.7-1.5, further preferably the ratio of $ZnO/B_2O_3$ in the range of 0.75-1.2, the glass stability and Tg temperature can reach the best balance to get better quality products.

$ZrO_2$ is a high-refraction low-dispersion oxide, which can enhance the refractive index of glass and adjust the dispersion if added into the glass. At the same time, the appropriate amount of $Zr_2$ is added into the glass, which can enhance the glass's anti-devitrification properties and glass forming stability. In the present invention, if the content is higher than 15%, the glass becomes difficult to melt, and the melting temperature increases, the inclusions and the transmittance of the glass are likely to decrease. Therefore, the $ZrO_2$ content is more than 0 but less than or equal to 15%, preferably 1-10%, and more preferably 2-8%.

$TiO_2$ is a high-refraction high-dispersion oxide, which can significantly enhance the glass refractive index and dispersion if added into the glass. The inventors of the present invention have found that it is possible to increase the glass stability, particularly the anti-devitrification property, by adding the appropriate amount of $TiO_2$ into the glass component of the present invention. However, if the $TiO_2$ is added too much, it will be difficult to achieve the development target of low dispersion, and also, the transmittance of glass will be significantly reduced and the stability of the glass will deteriorate. Therefore, the content of $TiO_2$ is 0-8%, preferably 0.1-6%, and more preferably 0.1-4%. In the present invention, the ratio of $TiO_2/(TiO_2+Nb_2O_5)$ is controlled to 0.1-0.9, by which the devitrification performance and chemical durability of the glass can be effectively adjusted, more preferably $TiO_2/(TiO_2+Nb_2O_5)$ to 0.2-0.8, and further preferably $TiO_2/(TiO_2+Nb_2O_5)$ to 0.3-0.7.

The main role of $WO_3$ in the glass is to maintain the optical constant and improve the devitrification of glass, but its content is too high, which will reduce the glass transmittance, increase pigmentation degree, and deteriorate the devitrification performance. Thus, the content of $WO_3$ is 0-10%, more preferably 0-5%, and further preferably 0-3%.

By introducing small amount of $Al_2O_3$, it can improve the stability and chemical stability of the glass. However, when the content exceeds 10%, the glass has a tendency to deteriorate the melt property and reduce the devitrification resistance. Therefore, the content of $Al_2O_3$ in the present invention is 0-10%, preferably 0-5%, more preferably 0-1%, and further preferably not introduced.

The addition of $Li_2O$ into the glass component can effectively reduce the Tg temperature of the glass, but the optical glass with low softening point is usually smelted with platinum or platinum alloy vessels. During high temperature smelting, $Li^+$ in the glass component easily corrodes platinum or platinum alloy vessels, resulting in more platinum-containing foreign matters in the finished glass, leading to a decline in the quality of the glass. In addition, more than 8% of $Li_2O$ in the present invention causes a sharp decrease in the devitrification performance of the glass, and therefore, the content thereof is limited to 0-8%, preferably 0-5%. The value of $4 \times ZrO_2/(ZnO+Li_2O)$ in the present invention is 0.3-1.6, preferably 0.35-1.2, more preferably 0.45-1, in order to better adjust the balance between the glass anti-devitrification property and glass forming ability and Tg temperature, which allows the glass to have a suitable Tg temperature while optimizing the anti-devitrification property and glass forming ability.

$Na_2O_5$ and $K_2O$ are any components effective for reducing the Tg, and if the content thereof is too large, it is easy to cause the devitrification temperature to be increased and hard to be vitrified, so that the contents thereof are limited to 0-10%, more preferably 0-5%, and further preferably 0-1% respectively.

RO (RO is one or more of MgO, CaO, SrO or BaO) can improve the meltability of the glass and adjust the optical property of the glass, but when its content exceeds 10%, the devitrification resistance of the glass will be lowered. The RO content of the present invention is 0-10%, more preferably 0-5%, and further preferably not introduced.

$P_2O_5$ is an optional component for improving the devitrification resistance of the glass, and particularly when the content of $P_2O_5$ is less than 10%, the chemical durability of the glass, particularly the decrease in water resistance, can be suppressed. Therefore, the content of the glass is preferably less than 10%, preferably less than 5%, more preferably less than 3%, and further preferably not introduced, with respect to the total mole content of the glass composed by oxide conversion.

$Bi_2O_3$ is an optional component capable of properly increasing the refractive index of glass and lowering the vitrification temperature, and when its content exceeds 10%, the glass devitrification resistance will be lowered, so that its content is limited to be less than 10%, preferably less than 5%, further preferably less than 1%, and furthermore preferably not introduced.

$GeO_2$ is a component having an effect of increasing the refractive index of the glass and increasing the resistance to devitrification, and is an optional component of the optical glass of the present invention. However, it is expensive and excessive introduction cannot achieve the purpose of reducing the production cost. Thus, the content thereof is preferably less than 8%, preferably less than 5%, further limited to less than 2%, and furthermore preferably not introduced.

According to the present invention, if $Lu_2O_3$ is introduced in an amount of less than 10%, it can be used in combination with other rare earth components to further improve the stability of the glass, but it is expensive and is not conducive to reducing the production cost if introduced in the glass. Therefore, the content thereof is preferably less than 5%, further preferably less than 3%, and furthermore preferably not introduced.

As an optional component of the present invention, when $Ga_2O_3$ is controlled to be less than 10%, the devitrification resistance of the glass can be improved, and the wear degree of the glass can be increased. Therefore, the content thereof is preferably less than 10%, further preferably less than 5%, furthermore preferably less than 3%, and further preferably not introduced.

$TeO_2$ is an optional component to improve the refractive index of glass and reduce the glass transition temperature of the glass. When its content thereof is too large, it is easy to have platinum crucible reaction, which is not conducive to the service life of the equipment. Therefore, the $TeO_2$ content is limited to be less than 10%, preferably less than 5%, and more preferably not introduced.

The addition of few $Sb_2O_3$, $SnO_2$ and $CeO_2$ components can improve the clarification effect of glass. However, when $Sb_2O_3$ content exceeds 1%, the glass has a tendency to clarify the performance degradation, and because of its strong oxidation, it promotes the corrosion of platinum or platinum alloy vessel for melting glass and the deterioration of the molding die. Therefore, the addition amount of $Sb_2O_3$ is preferably 0-1%, more preferably 0-0.5%, and further preferably not introduced. $SnO_2$ may also be added as a clarifying agent, but when the content thereof exceeds 1%, the glass may be colored, or when the glass is heated, softened, and molded, etc. Sn will become a starting point for nucleation, resulting in a tendency for devitrification. Therefore, the $SnO_2$ content of the present invention is preferably 0-1%, more preferably 0-0.5%, and further preferably not added. The role and the proportion of added amount of $CeO_2$ are consistent with $SnO_2$, so the content of $CeO_2$ is preferably 0-1%, more preferably 0-0.5%, and further preferably not added.

F is an effective component that is low in dispersion and reduces the glass transition temperature, but when it is excessively contained, the glass refractive index will be significantly reduced or the volatility of the glass melt will be increased, and texture will be produced during glass melt forming, or the tendency to increase the refractive index changes will be caused by volatilization. F, as a raw material, can be introduced by $YF_3$, $LaF_3$, $GdF_3$, $ZrF_4$, $ZnF_2$, alkali fluoride or alkaline earth fluoride. Preferably, the content of F in the present invention accounts for 0-10% of total mole content of optical glass, more preferably 0-5%, and further preferably not introduced.

In order to achieve the object of the present invention, the component of the glass is represented by mole percentage. The total content of $SiO_2$, $B_2O_3$, $La_2O_3$, $Gd_2O_3$, $Y_2O_3$, $TiO_2$, $Nb_2O_5$, $WO_3$, $ZrO_2$ and ZnO is preferably above 95%, excluding $Ta_2O_5$; the total content of $SiO_2$, $B_2O_3$, $La_2O_3$, $Gd_2O_3$, $Y_2O_3$, $TiO_2$, $Nb_2O_5$, $WO_3$, $ZrO_2$ and ZnO is more preferably above 99%, and the total content of $SiO_2$, $B_2O_3$, $La_2O_3$, $Gd_2O_3$, $Y_2O_3$, $TiO_2$, $Nb_2O_5$, $ZrO_2$ and ZnO is further preferably above 99%.

[About the Ingredients that should not be Included]

The other components not mentioned above can be added as required without impairing the glass characteristics of the present invention. However, for the transition metal components such as V, Cr, Mn, Fe, Co, Ni, Cu, Ag, and Mo, even if they are contained in a single or compound form, the glass could be colored and absorb at a specific wavelength in the visible light region, thereby impairing the properties of the present invention in improving the visible light transmittance, and therefore, in particular, for optical glass with requirement on wavelength transmittance in the visible region, it is preferably not actually included.

Pb, Th, Cd, Tl, Os, Be, and Se cations have been used in a controlled manner as a harmful chemical substance in recent years, which is necessary not only in the glass manufacturing process, but also in the manufacturing procedure and disposal after the productization for environmental protection measures. Therefore, in the case of attaching importance to the influence on the environment, it is preferably not actually included except for the inevitable incorporation. As a result, the optical glass does not actually contain a substance that contaminates the environment. Therefore, the optical glass of the present invention can be manufactured, processed, and discarded even if a measure is not taken as a special environmental countermeasure.

Hereinafter, the characteristics of the optical glass of the present invention will be described.

[Optical Constant of Optical Glass]

The optical glass of the present invention is a high-refraction low-dispersion glass, and a lens made of the high-refraction low-dispersion glass is combined with a lens made of high-refraction high-dispersion glass for chromatic aberration correction. The optical glass of the present invention has a glass refractive index (nd) in the range of 1.77-1.85, preferably in the range of 1.78-1.84, more preferably in the range of 1.785-1.84, from the viewpoint of imparting optical properties suitable for its use. The range of the Abbe number ($v_d$) of the glass is in the range of 40-48, preferably in the range of 41-47.

[Transition Temperature of Optical Glass]

The optical glass will gradually turn from solid state to plastic state within a certain temperature range. The transition temperature refers to the temperature at which the glass sample is heated from room temperature to the temperature of the sag temperature, and the temperature corresponding to the intersection of the low temperature region and the straight line extension of the high temperature region.

The glass of the present invention has a transition temperature (Tg) of below 630° C., preferably below 620° C., more preferably below 615° C., and further preferably below 610° C.

[Coloring of Optical Glass]

The short-wave transmission spectrum characteristics of the glass of the present invention are represented by pigmentation degree ($\lambda_{80}/\lambda_5$). $\lambda_{80}$ refers to a wavelength corresponding to a glass transmittance of 80%, and $\lambda_5$ is a wavelength corresponding to a glass transmittance of 5%. The measurement of $\lambda_{80}$ is carried out using a glass having a thickness of 10±0.1 nm with two opposing planes parallel to each other and optically polished, measuring the spectral transmittance in the wavelength region from 280 nm to 700 nm and a wavelength exhibiting 80% of the transmittance. The spectral transmittance or transmittance is an amount indicated by $I_{out}/I_{in}$ in the case where light of the intensity $I_{in}$ is incident perpendicularly to the above surface of the glass, passes through the glass and emits light of the intensity $I_{out}$ from one plane, including the transmittance of the surface reflection loss on the above surface of the glass. The higher the refractive index of the glass, the greater the surface reflection loss. Thus, in high refractive index glass, a small value of $\lambda_{80}$ means that the glass itself is colored very little.

The optical glass $\lambda_{80}$ of the present invention is less than or equal to 410 nm, preferably $\lambda_{80}$ is in the range of less than or equal to 405 nm, more preferably $\lambda_{80}$ is less than or equal to 400 nm, and further preferably $\lambda_{80}$ is less than or equal to 395 nm, and furthermore preferably $\lambda_{80}$ is less than or equal to 390 nm. $\lambda_5$ is less than or equal to 350 nm, preferably $\lambda_5$ is in the range of less than or equal to 345 nm, more preferably $\lambda_5$ is less than or equal to 340 nm, and further preferably $\lambda_5$ is less than or equal to 335 nm.

[The Density of Optical Glass]

The density of the optical glass is the mass per unit volume at a temperature of 20° C., expressed in g/cm$^3$.

The density ($\rho$) of the glass of the present invention is below 5.00 g/cm$^3$, preferably below 4.90 g/cm$^3$.

[Upper Limit of Devitrification Temperature]

The devitrification performance of the glass is measured by the temperature gradient furnace method. The glass is made into a sample of 180*10*10 mm. The side surface is polished and placed in a furnace with a temperature gradient for 4 hours before taking out. The glass devitrification is observed under a microscope. The highest temperature corresponding to the glass crystal is the upper limit of devitrification temperature of the glass. The lower the upper limit of devitrification temperature of glass is, the stronger the stability of glass under high temperature will be and the better production process performance will achieve.

The devitrification temperature of the glass of the present invention is below 1160° C., preferably below 1155° C., further preferably below 1150° C., and furthermore preferably below 1140° C.

II. Glass Preform and Optical Element

Hereinafter, an optical preform and an optical element of the present invention will be described.

The glass preform and the optical element of the present invention are both formed by the optical glass of the present invention described above. The glass preform of the present invention has a high refractive index and low dispersion. The optical element of the present invention has a high refractive index and low dispersion, which can provide optical elements such as various lenses and prisms having a high optical value at a low cost.

Examples of the lens include various lenses such as concave meniscus lens, convex meniscus lens, biconvex lens, biconcave lens, planoconvex lens, and planoconcave lens.

This lens is combined with a lens made of high-refraction high-dispersion glass to correct the chromatic aberration, suitable as a lens for chromatic aberration correction. In addition, the lens is also effective for the compactness of the optical system.

In addition, for the prism, due to the high refractive index, by combining in the optical system, you can achieve a compact wide-angle optical system through the curved optical path, towards the desired direction.

Embodiments

The present invention is explained by the following embodiments, but the present invention should not be limited to these embodiments.

The method of melting and molding optical glass can be carried out by a technique known to those skilled in the art. Weigh the glass raw materials (carbonate, nitrate, sulfate, hydroxide, oxide, boric acid, etc.) in the proportions of the glass oxides and mix evenly, then put into a smelting device (such as a platinum crucible), cool to below 1250° C. after appropriate mixing, clarification and homogenization at 1150~1400° C., pour or leak in a molding die, and finally experiencing post-processing by annealing, processing, etc., or complete compression molding directly with precision profiling technology.

[Optical Glass Embodiment]

In addition, the characteristics of each glass of the present invention are measured by the following methods, and the measurement results are shown in Tables 1 to 4, wherein K1 represents $SiO_2/B_2O_3$, K2 represents $Nb_2O_5/Gd_2O_3$, K3 represents $Ta_2O_5/Nb_2O_5$, K4 represents $ZnO/B_2O_3$, K5 represents $TiO_2/(TiO_2+Nb_2O_5)$, K6 represents $Gd_2O_3/(La_2O_3+Gd_2O_3+Y_2O_3)$, and K7 represents $4 \times ZrO_2/(ZnO+Li_2O)$.

(1) Refractive Index (Nd) and Abbe Number (vd)

The refractive index and Abbe number are measured as per the method specified in GB/T7962.1-2010.

(2) Pigmentation Degree of Glass ($\lambda_{80}/\lambda_5$)

The spectral transmittance is measured by using a glass sample having a thickness of 10±0.1 nm with two opposing planes parallel to each other and optically polished, and calculated on the basis of the result.

(3) Transition Temperature of Glass (Tg)

It is measured as per the method specified in GB/T7962.16-2010.

(4) The Density of Optical Glass ($\rho$)

It is measured as per the method specified in GB/T7962.20-2010.

(5) Upper Limit of Devitrification Temperature

The devitrification performance of the glass is measured by the temperature gradient furnace method. The glass is made into a sample of 180*10*10 mm. The side surface is polished and placed in a furnace with a temperature gradient for 4 hours before taking out. The glass devitrification is observed under a microscope. The highest temperature corresponding to the glass crystal is the upper limit of devitrification temperature of the glass.

(6) Devitrification in Glass Molding

After melting, clarification and homogenization, glass is molded into a block or molded material by flowing into the molding die through a platinum or platinum alloy discharge pipe. Then, observe the inside and the surface of the glass after cooling, and the appearance of crystal inside or on the surface of the glass indicates insufficient performance of glass devitrification. Express with "A" if no devitrification crystal appears inside or on the surface; express with "O" if devitrification crystal appears inside or on the surface.

TABLE 1

| Composition | Embodiment | | | | | |
|---|---|---|---|---|---|---|
| | 1 | 2 | 3 | 4 | 5 | 6 |
| $SiO_2$ | 13.25 | 8.36 | 9.16 | 18.65 | 6.35 | 14.20 |
| $B_2O_3$ | 27.32 | 23.42 | 30.14 | 28.46 | 18.49 | 37.14 |
| $La_2O_3$ | 10.52 | 6.74 | 18.50 | 14.15 | 8.24 | 9.25 |
| $Gd_2O_3$ | 5.26 | 10.32 | 14.32 | 7.26 | 17.14 | 2.36 |
| $Y_2O_3$ | 1.34 | 0.25 | 0.58 | 2.34 | 3.50 | 0.00 |
| $TiO_2$ | 1.22 | 3.23 | 0.37 | 2.40 | 0.97 | 4.25 |
| $Ta_2O_5$ | 0.00 | 0.45 | 0.00 | 0.00 | 0.00 | 1.23 |
| $Nb_2O_5$ | 2.15 | 1.55 | 0.52 | 3.13 | 4.37 | 1.57 |
| $ZrO_2$ | 4.37 | 7.26 | 2.36 | 3.25 | 5.16 | 3.64 |
| ZnO | 32.20 | 37.30 | 23.4 | 20.36 | 34.2 | 25.00 |
| $WO_3$ | 0.00 | 0.00 | 0.00 | 0.00 | 0.00 | 0.00 |
| $Li_2O$ | 2.37 | 1.12 | 0.65 | 0.00 | 1.58 | 1.36 |
| $Al_2O_3$ | 0.00 | 0.00 | 0.00 | 0.00 | 0.00 | 0.00 |
| $Yb_2O_3$ | 0.00 | 0.00 | 0.00 | 0.00 | 0.00 | 0.00 |
| $Na_2O$ | 0.00 | 0.00 | 0.00 | 0.00 | 0.00 | 0.00 |
| $K_2O$ | 0.00 | 0.00 | 0.00 | 0.00 | 0.00 | 0.00 |
| RO | 0.00 | 0.00 | 0.00 | 0.00 | 0.00 | 0.00 |
| $P_2O_5$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| $TeO_2$ | 0.00 | 0.00 | 0.00 | 0.00 | 0.00 | 0.00 |
| $Ga_2O_3$ | 0.00 | 0.00 | 0.00 | 0.00 | 0.00 | 0.00 |
| $Lu_2O_3$ | 0.00 | 0.00 | 0.00 | 0.00 | 0.00 | 0.00 |
| $GeO_2$ | 0.00 | 0.00 | 0.00 | 0.00 | 0.00 | 0.00 |
| $Sb_2O_3$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| F | 0.00 | 0.00 | 0.00 | 0.00 | 0.00 | 0.00 |
| Total | 100.00 | 100.00 | 100.00 | 100.00 | 100.00 | 100.00 |
| K1 | 0.485 | 0.357 | 0.304 | 0.655 | 0.343 | 0.382 |
| K2 | 0.409 | 0.150 | 0.036 | 0.431 | 0.255 | 0.665 |
| K3 | 0 | 0.290 | 0 | 0 | 0 | 0.783 |
| K4 | 1.179 | 1.593 | 0.776 | 0.715 | 1.850 | 0.673 |
| K5 | 0.362 | 0.676 | 0.416 | 0.434 | 0.182 | 0.730 |
| K6 | 0.307 | 0.596 | 0.429 | 0.306 | 0.593 | 0.203 |
| K7 | 0.506 | 0.756 | 0.393 | 0.639 | 0.577 | 0.552 |
| nd | 1.82214 | 1.81421 | 1.84265 | 1.81326 | 1.83431 | 1.78425 |
| vd | 42.65 | 43.21 | 45.26 | 44.15 | 42.32 | 46.35 |
| Tg (° C.) | 603.2 | 601.1 | 611.0 | 612.0 | 604.5 | 606.3 |
| ρ(g/cm$^3$) | 4.82 | 4.85 | 4.78 | 4.81 | 4.90 | 4.75 |
| $\lambda_{80}/\lambda_5$ | 385/325 | 392/332 | 385/325 | 392/333 | 395/335 | 380/320 |
| Upper limit of devitrification temperature (° C.) | 1140 | 1145 | 1142 | 1143 | 1140 | 1137 |
| Devitrification status | A | A | A | A | A | A |

| Composition | 7 | 8 | 9 | 10 |
|---|---|---|---|---|
| $SiO_2$ | 22.12 | 10.26 | 12.30 | 13.95 |
| $B_2O_3$ | 22.34 | 18.38 | 40.20 | 28.65 |
| $La_2O_3$ | 7.45 | 11.2 | 10.21 | 12.40 |
| $Gd_2O_3$ | 5.52 | 5.62 | 3.35 | 6.34 |
| $Y_2O_3$ | 1.32 | 2.35 | 1.24 | 1.22 |
| $TiO_2$ | 1.75 | 5.30 | 1.05 | 1.74 |
| $Ta_2O_5$ | 0 | 0.00 | 0.00 | 0.00 |
| $Nb_2O_5$ | 5.24 | 2.24 | 0.65 | 1.47 |
| $ZrO_2$ | 4.2 | 11.25 | 3.20 | 6.32 |
| ZnO | 28.72 | 25.67 | 27.22 | 26.38 |
| $WO_3$ | 0.00 | 3.25 | 0.00 | 0.00 |
| $Li_2O$ | 1.34 | 3.26 | 0.58 | 1.53 |
| $Al_2O_3$ | 0.00 | 1.22 | 0.00 | 0.00 |
| $Yb_2O_3$ | 0.00 | 0.00 | 0.00 | 0.00 |
| $Na_2O$ | 0.00 | 0.00 | 0.00 | 0.00 |
| $K_2O$ | 0.00 | 0.00 | 0.00 | 0.00 |
| RO | 0.00 | 0.00 | 0.00 | 0.00 |
| $P_2O_5$ | 0.00 | 0.00 | 0.00 | 0.00 |
| $Bi_2O_3$ | 0.00 | 0.00 | 0.00 | 0.00 |
| $TeO_2$ | 0.00 | 0.00 | 0.00 | 0.00 |

TABLE 1-continued

| | | Embodiment | | | |
|---|---|---|---|---|---|
| | $Ga_2O_3$ | 0.00 | 0.00 | 0.00 | 0.00 |
| | $Lu_2O_3$ | 0.00 | 0.00 | 0.00 | 0.00 |
| | $GeO_2$ | 0.00 | 0.00 | 0.00 | 0.00 |
| | $Sb_2O_3$ | 0.00 | 0.00 | 0.00 | 0.00 |
| | $CeO_2$ | 0.00 | 0.00 | 0.00 | 0.00 |
| | $SnO_2$ | 0.00 | 0.00 | 0.00 | 0.00 |
| | F | 0.00 | 0.00 | 0.00 | 0.00 |
| | Total | 100.00 | 100.00 | 100.00 | 100.00 |
| | K1 | 0.990 | 0.558 | 0.306 | 0.487 |
| | K2 | 0.949 | 0.399 | 0.194 | 0.232 |
| | K3 | 0 | 0 | 0 | 0 |
| | K4 | 1.286 | 1.397 | 0.677 | 0.921 |
| | K5 | 0.250 | 0.703 | 0.618 | 0.542 |
| | K6 | 0.386 | 0.293 | 0.226 | 0.318 |
| | K7 | 0.559 | 1.555 | 0.460 | 0.906 |
| | nd | 1.83258 | 1.83141 | 1.79124 | 1.80136 |
| | vd | 41.40 | 42.36 | 45.85 | 44.72 |
| | Tg (° C.) | 605.1 | 608.2 | 606.4 | 603.2 |
| | $\rho(g/cm^3)$ | 4.88 | 4.87 | 4.74 | 4.81 |
| | $\lambda_{80}/\lambda_5$ | 393/332 | 398/338 | 375/315 | 383/323 |
| | Upper limit of devitrification temperature (° C.) | 1145 | 1130 | 1135 | 1140 |
| | Devitrification status | A | A | A | A |

TABLE 2

| | Embodiment | | | | | |
|---|---|---|---|---|---|---|
| Composition | 11 | 12 | 13 | 14 | 15 | 16 |
| $SiO_2$ | 13.10 | 13.62 | 15.36 | 17.25 | 14.32 | 16.20 |
| $B_2O_3$ | 43.20 | 35.24 | 27.54 | 26.33 | 32.50 | 28.10 |
| $La_2O_3$ | 8.35 | 12.20 | 11.40 | 9.35 | 10.24 | 13.40 |
| $Gd_2O_3$ | 3.52 | 6.34 | 4.25 | 5.34 | 4.15 | 5.23 |
| $Y_2O_3$ | 0.74 | 1.24 | 1.36 | 2.16 | 1.35 | 2.11 |
| $TiO_2$ | 0.85 | 2.25 | 1.25 | 1.44 | 1.22 | 1.37 |
| $Ta_2O_5$ | 0.00 | 0.00 | 0.00 | 0.00 | 0.00 | 0.00 |
| $Nb_2O_5$ | 0.56 | 1.42 | 2.55 | 3.25 | 0.67 | 2.24 |
| $ZrO_2$ | 3.25 | 3.60 | 4.36 | 4.15 | 3.23 | 5.32 |
| ZnO | 24.96 | 22.84 | 29.43 | 29.38 | 30.85 | 23.73 |
| $WO_3$ | 0.00 | 0.00 | 0.00 | 0.00 | 0.00 | 0.00 |
| $Li_2O$ | 1.47 | 1.25 | 2.50 | 1.35 | 1.47 | 2.30 |
| $Al_2O_3$ | 0.00 | 0.00 | 0.00 | 0.00 | 0.00 | 0.00 |
| $Yb_2O_3$ | 0.00 | 0.00 | 0.00 | 0.00 | 0.00 | 0.00 |
| $Na_2O$ | 0.00 | 0.00 | 0.00 | 0.00 | 0.00 | 0.00 |
| $K_2O$ | 0.00 | 0.00 | 0.00 | 0.00 | 0.00 | 0.00 |
| RO | 0.00 | 0.00 | 0.00 | 0.00 | 0.00 | 0.00 |
| $P_2O_5$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| $TeO_2$ | 0.00 | 0.00 | 0.00 | 0.00 | 0.00 | 0.00 |
| $Ga_2O_3$ | 0.00 | 0.00 | 0.00 | 0.00 | 0.00 | 0.00 |
| $Lu_2O_3$ | 0.00 | 0.00 | 0.00 | 0.00 | 0.00 | 0.00 |
| $GeO_2$ | 0.00 | 0.00 | 0.00 | 0.00 | 0.00 | 0.00 |
| $Sb_2O_3$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| F | 0.00 | 0.00 | 0.00 | 0.00 | 0.00 | 0.00 |
| Total | 100.00 | 100.00 | 100.00 | 100.00 | 100.00 | 100.00 |
| K1 | 0.303 | 0.386 | 0.558 | 0.655 | 0.441 | 0.577 |
| K2 | 0.159 | 0.224 | 0.600 | 0.609 | 0.161 | 0.428 |
| K3 | 0 | 0 | 0 | 0 | 0 | 0 |
| K4 | 0.578 | 0.648 | 1.068 | 1.116 | 0.949 | 0.844 |
| K5 | 0.603 | 0.613 | 0.329 | 0.307 | 0.646 | 0.380 |
| K6 | 0.279 | 0.321 | 0.250 | 0.317 | 0.264 | 0.252 |
| K7 | 0.492 | 0.598 | 0.546 | 0.540 | 0.400 | 0.817 |
| nd | 1.78233 | 1.81355 | 1.82435 | 1.82362 | 1.82254 | 1.79525 |
| vd | 46.25 | 41.76 | 42.72 | 42.50 | 42.75 | 45.63 |
| Tg (° C.) | 607.8 | 606.5 | 603.4 | 604.2 | 602.3 | 605.2 |
| $\rho(g/cm^3)$ | 4.75 | 4.80 | 4.81 | 4.82 | 4.77 | 4.83 |
| $\lambda_{80}/\lambda_5$ | 385/325 | 390/330 | 392/332 | 388/328 | 385/325 | 380/320 |

TABLE 2-continued

| | Embodiment | | | | | |
|---|---|---|---|---|---|---|
| Upper limit of devitrification temperature (° C.) | 1130 | 1132 | 1141 | 1136 | 1135 | 1127 |
| Devitrification status | A | A | A | A | A | A |

| Composition | 17 | 18 | 19 | 20 |
|---|---|---|---|---|
| $SiO_2$ | 9.66 | 12.56 | 14.25 | 11.57 |
| $B_2O_3$ | 24.35 | 33.24 | 30.40 | 36.20 |
| $La_2O_3$ | 7.25 | 9.25 | 12.24 | 9.58 |
| $Gd_2O_3$ | 8.20 | 7.34 | 5.15 | 4.25 |
| $Y_2O_3$ | 1.62 | 4.25 | 1.47 | 1.55 |
| $TiO_2$ | 2.50 | 1.34 | 1.30 | 1.20 |
| $Ta_2O_5$ | 0.00 | 0.00 | 0.00 | 0.00 |
| $Nb_2O_5$ | 1.67 | 0.52 | 1.06 | 0.59 |
| $ZrO_2$ | 8.14 | 3.25 | 6.20 | 4.10 |
| ZnO | 31.81 | 26.33 | 26.56 | 28.90 |
| $WO_3$ | 3.26 | 0.00 | 0.00 | 0.00 |
| $Li_2O$ | 1.20 | 1.57 | 1.37 | 2.06 |
| $Al_2O_3$ | 0.00 | 0.00 | 0.00 | 0.00 |
| $Yb_2O_3$ | 0.34 | 0.00 | 0.00 | 0.00 |
| $Na_2O$ | 0.00 | 0.35 | 0.00 | 0.00 |
| $K_2O$ | 0.00 | 0.00 | 0.00 | 0.00 |
| RO | 0.00 | 0.00 | 0.00 | 0.00 |
| $P_2O_5$ | 0.00 | 0.00 | 0.00 | 0.00 |
| $Bi_2O_3$ | 0.00 | 0.00 | 0.00 | 0.00 |
| $TeO_2$ | 0.00 | 0.00 | 0.00 | 0.00 |
| $Ga_2O_3$ | 0.00 | 0.00 | 0.00 | 0.00 |
| $Lu_2O_3$ | 0.00 | 0.00 | 0.00 | 0.00 |
| $GeO_2$ | 0.00 | 0.00 | 0.00 | 0.00 |
| $Sb_2O_3$ | 0.00 | 0.00 | 0.00 | 0.00 |
| $CeO_2$ | 0.00 | 0.00 | 0.00 | 0.00 |
| $SnO_2$ | 0.00 | 0.00 | 0.00 | 0.00 |
| F | 0.00 | 0.00 | 0.00 | 0.00 |
| Total | 100.00 | 100.00 | 100.00 | 100.00 |
| K1 | 0.397 | 0.378 | 0.469 | 0.320 |
| K2 | 0.204 | 0.071 | 0.206 | 0.139 |
| K3 | 0 | 0 | 0 | 0 |
| K4 | 1.306 | 0.792 | 0.874 | 0.798 |
| K5 | 0.600 | 0.720 | 0.551 | 0.670 |
| K6 | 0.480 | 0.352 | 0.273 | 0.276 |
| K7 | 0.986 | 0.466 | 0.888 | 0.530 |
| nd | 1.78125 | 1.79356 | 1.81452 | 1.79525 |
| vd | 46.50 | 45.25 | 43.50 | 45.47 |
| Tg (° C.) | 607.5 | 601.5 | 603.3 | 600.2 |
| $\rho$(g/cm$^3$) | 4.81 | 4.80 | 4.81 | 4.73 |
| $\lambda_{80}/\lambda_5$ | 391/332 | 384/325 | 387/325 | 376/325 |
| Upper limit of devitrification temperature (° C.) | 1141 | 1138 | 1142 | 1131 |
| Devitrification status | A | A | A | A |

TABLE 3

| | Embodiment | | | | | |
|---|---|---|---|---|---|---|
| Composition | 21 | 22 | 23 | 24 | 25 | 26 |
| $SiO_2$ | 11.36 | 15.24 | 12.40 | 14.29 | 12.40 | 15.20 |
| $B_2O_3$ | 24.15 | 34.10 | 31.25 | 29.33 | 32.33 | 26.12 |
| $La_2O_3$ | 6.35 | 12.05 | 10.45 | 11.25 | 8.24 | 7.69 |
| $Gd_2O_3$ | 12.33 | 5.66 | 7.25 | 5.40 | 3.52 | 4.55 |
| $Y_2O_3$ | 7.25 | 2.51 | 1.37 | 0.63 | 1.24 | 1.69 |
| $TiO_2$ | 1.38 | 1.24 | 3.25 | 0.47 | 1.15 | 2.20 |
| $Ta_2O_5$ | 0.00 | 0.00 | 0.00 | 0.00 | 0.00 | 0.00 |
| $Nb_2O_5$ | 2.16 | 0.36 | 0.74 | 2.67 | 0.68 | 1.44 |
| $ZrO_2$ | 4.25 | 2.74 | 5.20 | 3.20 | 4.15 | 6.37 |
| ZnO | 29.16 | 23.90 | 26.29 | 30.39 | 33.26 | 32.4 |
| $WO_3$ | 0.00 | 0.00 | 0.00 | 0.00 | 0.00 | 0.00 |
| $Li_2O$ | 1.36 | 2.20 | 1.80 | 2.37 | 1.20 | 2.2 |
| $Al_2O_3$ | 0.00 | 0.00 | 0.00 | 0.00 | 0.57 | 0.00 |
| $Yb_2O_3$ | 0.00 | 0.00 | 0.00 | 0.00 | 0.00 | 0.00 |

TABLE 3-continued

| | Embodiment | | | | | |
|---|---|---|---|---|---|---|
| Na$_2$O | 0.00 | 0.00 | 0.00 | 0.00 | 0.00 | 0.00 |
| K$_2$O | 0.00 | 0.00 | 0.00 | 0.00 | 0.00 | 0.00 |
| RO | 0.00 | 0.00 | 0.00 | 0.00 | 1.26 | 0.00 |
| P$_2$O$_5$ | 0.00 | 0.00 | 0.00 | 0.00 | 0.00 | 0.00 |
| Bi$_2$O$_3$ | 0.00 | 0.00 | 0.00 | 0.00 | 0.00 | 0.00 |
| TeO$_2$ | 0.00 | 0.00 | 0.00 | 0.00 | 0.00 | 0.00 |
| Ga$_2$O$_3$ | 0.00 | 0.00 | 0.00 | 0.00 | 0.00 | 0.00 |
| Lu$_2$O$_3$ | 0.00 | 0.00 | 0.00 | 0.00 | 0.00 | 0.00 |
| GeO$_2$ | 0.00 | 0.00 | 0.00 | 0.00 | 0.00 | 0.00 |
| Sb$_2$O$_3$ | 0.25 | 0.00 | 0.00 | 0.00 | 0.00 | 0.14 |
| CeO$_2$ | 0.00 | 0.00 | 0.00 | 0.00 | 0.00 | 0.00 |
| SnO$_2$ | 0.00 | 0.00 | 0.00 | 0.00 | 0.00 | 0.00 |
| F | 0.00 | 0.00 | 0.00 | 0.00 | 0.00 | 0.00 |
| Total | 100.00 | 100.00 | 100.00 | 100.00 | 100.00 | 100.00 |
| K1 | 0.470 | 0.447 | 0.397 | 0.487 | 0.384 | 0.582 |
| K2 | 0.175 | 0.064 | 0.102 | 0.494 | 0.193 | 0.316 |
| K3 | 0 | 0 | 0 | 0 | 0 | 0 |
| K4 | 1.207 | 0.701 | 0.841 | 1.036 | 1.029 | 1.240 |
| K5 | 0.390 | 0.775 | 0.815 | 0.150 | 0.628 | 0.604 |
| K6 | 0.476 | 0.280 | 0.380 | 0.312 | 0.271 | 0.327 |
| K7 | 0.557 | 0.420 | 0.740 | 0.391 | 0.482 | 0.736 |
| nd | 1.82243 | 1.79428 | 1.79365 | 1.80245 | 1.79366 | 1.83251 |
| vd | 42.50 | 45.33 | 44.85 | 45.20 | 45.64 | 41.26 |
| Tg (° C.) | 603.2 | 602.1 | 605.2 | 601.5 | 602.2 | 598.5 |
| ρ(g/cm$^3$) | 4.85 | 4.80 | 4.82 | 4.81 | 4.79 | 4.83 |
| λ$_{80}$/λ$_5$ | 386/325 | 385/325 | 384/325 | 388/330 | 380/320 | 390/330 |
| Upper limit of devitrification temperature (° C.) | 1140 | 1137 | 1135 | 1130 | 1131 | 1145 |
| Devitrification status | A | A | A | A | A | A |

| Composition | 27 | 28 | 29 | 30 |
|---|---|---|---|---|
| SiO$_2$ | 13.26 | 16.22 | 14.20 | 12.36 |
| B$_2$O$_3$ | 25.85 | 34.20 | 35.14 | 30.50 |
| La$_2$O$_3$ | 10.24 | 9.35 | 11.20 | 12.25 |
| Gd$_2$O$_3$ | 8.30 | 6.80 | 4.65 | 5.36 |
| Y$_2$O$_3$ | 1.24 | 1.20 | 0.68 | 1.17 |
| TiO$_2$ | 2.65 | 1.22 | 0.36 | 1.32 |
| Ta$_2$O$_5$ | 0.00 | 0.00 | 0.00 | 0.00 |
| Nb$_2$O$_5$ | 2.47 | 0.45 | 1.57 | 1.52 |
| ZrO$_2$ | 5.60 | 3.26 | 4.26 | 5.06 |
| ZnO | 28.3 | 26.16 | 25.94 | 29.16 |
| WO$_3$ | 0.00 | 0.00 | 0.00 | 0.00 |
| Li$_2$O | 1.85 | 0.85 | 2.00 | 1.30 |
| Al$_2$O$_3$ | 0.00 | 0.00 | 0.00 | 0.00 |
| Yb$_2$O$_3$ | 0.00 | 0.00 | 0.00 | 0.00 |
| Na$_2$O | 0.00 | 0.14 | 0.00 | 0.00 |
| K$_2$O | 0.00 | 0.00 | 0.00 | 0.00 |
| RO | 0.00 | 0.00 | 0.00 | 0.00 |
| P$_2$O$_5$ | 0.00 | 0.00 | 0.00 | 0.00 |
| Bi$_2$O$_3$ | 0.00 | 0.00 | 0.00 | 0.00 |
| TeO$_2$ | 0.00 | 0.00 | 0.00 | 0.00 |
| Ga$_2$O$_3$ | 0.00 | 0.00 | 0.00 | 0.00 |
| Lu$_2$O$_3$ | 0.00 | 0.00 | 0.00 | 0.00 |
| GeO$_2$ | 0.00 | 0.00 | 0.00 | 0.00 |
| Sb$_2$O$_3$ | 0.00 | 0.00 | 0.00 | 0.00 |
| CeO$_2$ | 0.00 | 0.15 | 0.00 | 0.00 |
| SnO$_2$ | 0.00 | 0.00 | 0.00 | 0.00 |
| F | 0.00 | 0.00 | 0.00 | 0.00 |
| Total | 100.00 | 100.00 | 100.00 | 100.00 |
| K1 | 0.513 | 0.474 | 0.404 | 0.405 |
| K2 | 0.298 | 0.066 | 0.338 | 0.284 |
| K3 | 0 | 0 | 0 | 0 |
| K4 | 1.095 | 0.765 | 0.738 | 0.956 |
| K5 | 0.518 | 0.731 | 0.187 | 0.465 |
| K6 | 0.420 | 0.392 | 0.282 | 0.285 |
| K7 | 0.743 | 0.483 | 0.610 | 0.664 |
| nd | 1.82752 | 1.79455 | 1.78968 | 1.80254 |
| vd | 41.65 | 45.37 | 45.33 | 43.22 |
| Tg (° C.) | 603.5 | 603.8 | 602.5 | 604.1 |
| ρ(g/cm$^3$) | 4.81 | 4.80 | 4.78 | 4.80 |
| λ$_{80}$/λ$_5$ | 392/332 | 380/320 | 377/315 | 380/320 |

TABLE 3-continued

| | Embodiment | | | |
|---|---|---|---|---|
| | | | | |
| Upper limit of devitrification temperature (° C.) | 1140 | 1135 | 1130 | 1130 |
| Devitrification status | A | A | A | A |

TABLE 4

| | Embodiment | | | | | |
|---|---|---|---|---|---|---|
| Composition | 31 | 32 | 33 | 34 | 35 | 36 |
| $SiO_2$ | 12.38 | 15.20 | 13.27 | 13.38 | 14.33 | 11.50 |
| $B_2O_3$ | 34.15 | 29.40 | 28.36 | 30.22 | 27.26 | 26.30 |
| $La_2O_3$ | 12.20 | 9.22 | 10.35 | 11.40 | 12.50 | 9.14 |
| $Gd_2O_3$ | 6.24 | 4.63 | 5.32 | 5.46 | 6.15 | 4.60 |
| $Y_2O_3$ | 1.74 | 2.50 | 1.48 | 1.63 | 2.13 | 1.82 |
| $TiO_2$ | 2.55 | 1.73 | 1.30 | 1.77 | 1.42 | 0.58 |
| $Ta_2O_5$ | 0.00 | 0.00 | 0.00 | 0.00 | 0.00 | 0.00 |
| $Nb_2O_5$ | 0.87 | 1.68 | 1.38 | 1.56 | 2.60 | 1.30 |
| $ZrO_2$ | 3.25 | 6.30 | 5.17 | 4.38 | 5.16 | 6.24 |
| ZnO | 25.17 | 25.39 | 31.27 | 28.47 | 25.71 | 34.89 |
| $WO_3$ | 0.00 | 2.45 | 0.00 | 0.00 | 0.00 | 0.00 |
| $Li_2O$ | 1.45 | 1.50 | 2.10 | 1.73 | 1.54 | 1.57 |
| $Al_2O_3$ | 0.00 | 0.00 | 0.00 | 0.00 | 1.20 | 0.00 |
| $Yb_2O_3$ | 0.00 | 0.00 | 0.00 | 0.00 | 0.00 | 0.36 |
| $Na_2O$ | 0.00 | 0.00 | 0.00 | 0.00 | 0.00 | 0.00 |
| $K_2O$ | 0.00 | 0.00 | 0.00 | 0.00 | 0.00 | 0.00 |
| RO | 0.00 | 0.00 | 0.00 | 0.00 | 0.00 | 1.40 |
| $P_2O_5$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| $TeO_2$ | 0.00 | 0.00 | 0.00 | 0.00 | 0.00 | 0.00 |
| $Ga_2O_3$ | 0.00 | 0.00 | 0.00 | 0.00 | 0.00 | 0.00 |
| $Lu_2O_3$ | 0.00 | 0.00 | 0.00 | 0.00 | 0.00 | 0.00 |
| $GeO_2$ | 0.00 | 0.00 | 0.00 | 0.00 | 0.00 | 0.00 |
| $Sb_2O_3$ | 0.00 | 0.00 | 0.00 | 0.00 | 0.00 | 0.30 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| F | 0.00 | 0.00 | 0.00 | 0.00 | 0.00 | 0.00 |
| Total | 100.00 | 100.00 | 100.00 | 100.00 | 100.00 | 100.00 |
| K1 | 0.363 | 0.517 | 0.468 | 0.443 | 0.526 | 0.437 |
| K2 | 0.139 | 0.363 | 0.259 | 0.286 | 0.423 | 0.283 |
| K3 | 0 | 0 | 0 | 0 | 0 | 0 |
| K4 | 0.737 | 0.864 | 1.103 | 0.942 | 0.943 | 1.327 |
| K5 | 0.746 | 0.507 | 0.485 | 0.532 | 0.353 | 0.309 |
| K6 | 0.309 | 0.283 | 0.310 | 0.295 | 0.296 | 0.296 |
| K7 | 0.488 | 0.937 | 0.620 | 0.580 | 0.757 | 0.685 |
| nd | 1.79545 | 1.81652 | 1.82322 | 1.81420 | 1.82436 | 1.80452 |
| vd | 45.62 | 42.57 | 42.75 | 43.25 | 42.50 | 43.15 |
| Tg (° C.) | 605.2 | 604.4 | 600.5 | 603.3 | 603.5 | 601.4 |
| $\rho$(g/cm$^3$) | 4.79 | 4.83 | 4.84 | 4.81 | 4.82 | 4.82 |
| $\lambda_{80}/\lambda_5$ | 382/322 | 385/325 | 388/328 | 386/325 | 383/322 | 385/325 |
| Upper limit of devitrification temperature (° C.) | 1135 | 1136 | 1133 | 1130 | 1135 | 1137 |
| Devitrification status | A | A | A | A | A | A |

| Composition | 37 | 38 | 39 | 40 |
|---|---|---|---|---|
| $SiO_2$ | 16.21 | 12.70 | 13.50 | 12.67 |
| $B_2O_3$ | 35.15 | 27.19 | 27.16 | 31.52 |
| $La_2O_3$ | 10.26 | 8.52 | 12.20 | 10.35 |
| $Gd_2O_3$ | 4.58 | 7.05 | 5.85 | 5.62 |
| $Y_2O_3$ | 0.45 | 2.48 | 0.76 | 1.74 |
| $TiO_2$ | 0.60 | 1.65 | 2.20 | 1.38 |
| $Ta_2O_5$ | 0.00 | 0.00 | 0.00 | 0.00 |
| $Nb_2O_5$ | 0.62 | 1.88 | 1.25 | 1.03 |
| $ZrO_2$ | 4.72 | 5.36 | 5.38 | 4.52 |
| ZnO | 25.61 | 30.2 | 29.30 | 29.65 |
| $WO_3$ | 0.00 | 1.23 | 0.00 | 0.00 |
| $Li_2O$ | 1.80 | 1.74 | 2.40 | 1.52 |
| $Al_2O_3$ | 0.00 | 0.00 | 0.00 | 0.00 |
| $Yb_2O_3$ | 0.00 | 0.00 | 0.00 | 0.00 |

TABLE 4-continued

| | Embodiment | | | |
|---|---|---|---|---|
| $Na_2O$ | 0.00 | 0.00 | 0.00 | 0.00 |
| $K_2O$ | 0.00 | 0.00 | 0.00 | 0.00 |
| RO | 0.00 | 0.00 | 0.00 | 0.00 |
| $P_2O_5$ | 0.00 | 0.00 | 0.00 | 0.00 |
| $Bi_2O_3$ | 0.00 | 0.00 | 0.00 | 0.00 |
| $TeO_2$ | 0.00 | 0.00 | 0.00 | 0.00 |
| $Ga_2O_3$ | 0.00 | 0.00 | 0.00 | 0.00 |
| $Lu_2O_3$ | 0.00 | 0.00 | 0.00 | 0.00 |
| $GeO_2$ | 0.00 | 0.00 | 0.00 | 0.00 |
| $Sb_2O_3$ | 0.00 | 0.00 | 0.00 | 0.00 |
| $CeO_2$ | 0.00 | 0.00 | 0.00 | 0.00 |
| $SnO_2$ | 0.00 | 0.00 | 0.00 | 0.00 |
| F | 0.00 | 0.00 | 0.00 | 0.00 |
| Total | 100.00 | 100.00 | 100.00 | 100.00 |
| K1 | 0.461 | 0.467 | 0.497 | 0.402 |
| K2 | 0.135 | 0.267 | 0.214 | 0.183 |
| K3 | 0 | 0 | 0 | 0 |
| K4 | 0.729 | 1.111 | 1.079 | 0.941 |
| K5 | 0.492 | 0.467 | 0.638 | 0.573 |
| K6 | 0.300 | 0.391 | 0.311 | 0.317 |
| K7 | 0.689 | 0.671 | 0.679 | 0.580 |
| nd | 1.79258 | 1.82455 | 1.83042 | 1.79615 |
| vd | 45.61 | 41.68 | 42.85 | 45.35 |
| Tg (° C.) | 605.5 | 602.3 | 601.8 | 601.5 |
| $\rho(g/cm^3)$ | 4.80 | 4.83 | 4.81 | 4.80 |
| $\lambda_{80}/\lambda_5$ | 380/320 | 382/320 | 386/325 | 380/320 |
| Upper limit of devitrification temperature (° C.) | 1130 | 1131 | 1135 | 1130 |
| Devitrification status | A | A | A | A |

[Glass Preform Embodiment]

The optical glass obtained in Embodiments 1-10 in Table 1 is cut into a predetermined size, and the release agent is uniformly coated on the surface. Then, the mold is heated and softened to be press-molded to produce a concave meniscus lens, a convex meniscus lens, a biconvex lens, a biconcave lens, a planoconvex lens, a planoconcave lens, and other various lens and prism preform.

[Optical Element Embodiment]

The preforms obtained in the above-mentioned glass preform embodiment are annealed for fine-tuning while reducing the deformation inside the glass, so that the optical characteristics such as the refractive index are brought to the desired values.

Then, each of the preforms is ground and polished, and a variety of lenses and prisms such as concave meniscus lens, convex meniscus lens, biconvex lens, biconcave lens, planoconvex lens, and planoconcave lens are prepared. The antireflection film may be coated on the surface of the obtained optical element.

The present invention provides a high-refraction low-dispersion optical glass having a low cost and excellent chemical stability, with refractive index of 1.77-1.85 and Abbe number of 40-48, and an optical element made of the glass, capable of satisfying the needs of modern novel photoelectric products.

The invention claimed is:

1. An optical glass, comprising the following components by mole percentage: 5-25% of $SiO_2$, 15-45% of $B_2O_3$, 5-25% of $La_2O_3$, 1-20% of $Gd_2O_3$, 0-10% of $Y_2O_3$, 0-8% of $TiO_2$, 0-8% of $Ta_2O_5$, more than 0 but less than or equal to 8% of $Nb_2O_5$, more than 0 but less than or equal to 15% of $ZrO_2$, and 18-40% of ZnO, wherein a ratio of $SiO_2/B_2O_3$ is 0.28-1.2 a ratio of $Nb_2O_5/Gd_2O_3$ is 0.01-1, and a ratio of $Ta_2O_5/Nb_2O_5$ is less than 1.

2. The optical glass according to claim 1, further comprising the following components by mole percentage: 0-10% of $WO_3$ and 0-8% of $Li_2O$.

3. The optical glass according to claim 1, further comprising the following components by mole percentage: 0-10% of $Al_2O_3$, 0-10% of $Yb_2O_3$, 0-10% of $Na_2O$, 0-10% of $K_2O$, 0-1% of $Sb_2O_3$, and 0-10% of RO (in which RO is one or more of MgO, CaO, SrO or BaO).

4. The optical glass according to claim 1, comprising: 0-5% of $Al_2O_3$, and/or 0-5% of $Yb_2O_3$, and/or 0-5% of $Na_2O$, and/or 0-5% of $K_2O$, and/or 0-0.5% of $Sb_2O_3$, and/or 0-5% of RO (in which RO is one or more of MgO, CaO, SrO or BaO).

5. The optical glass according to claim 1, further comprising the following components by mole percentage: 0-10% of $P_2O_5$, 0-10% of $Bi_2O_3$, 0-10% of $TeO_2$, 0-10% of $Ga_2O_3$, 0-10% of $Lu_2O_3$, 0-8% of $GeO_2$, 0-1% of $CeO_2$, 0-1% of $SnO_2$, and 0-10% of F.

6. The optical glass according to claim 1, comprising: 8-23% of $SiO_2$, and/or 20-42% of $B_2O_3$, and/or 5-20% of $La_2O_3$, and/or 2-15% of $Gd_2O_3$, and/or 0.1-8% of $Y_2O_3$, and/or 0.1-6% of $TiO_2$, and/or 0-5% of $Ta_2O_5$, and/or 0.1-6% of $Nb_2O_5$, and/or 1-10% of $ZrO_2$, and/or 20-38% of ZnO, and/or 0-5% of $WO_3$, and/or 0-5% of $Li_2O$.

7. The optical glass according to claim 1, comprising: 9-20% of $SiO_2$, and/or 23-38% of $B_2O_3$, and/or 6-15% of $La_2O_3$, and/or 2-10% of $Gd_2O_3$, and/or 0.5-5% of $Y_2O_3$, and/or 0.1-4% of $TiO_2$, and/or 0-3% of $Ta_2O_5$, and/or 0.1-4% of $Nb_2O_5$, and/or 2-8% of $ZrO_2$, and/or 23-35% of ZnO.

8. The optical glass according to claim 1, wherein: the total content of $SiO_2$, $B_2O_3$, $La_2O_3$, $Gd_2O_3$, $Y_2O_3$, $TiO_2$, $Nb_2O_5$, $WO_3$, $ZrO_2$ and ZnO is above 95%.

9. The optical glass according to claim 8, wherein the optical glass does not include any $Ta_2O_5$.

10. The optical glass according to claim 1, wherein: the total content of $SiO_2$, $B_2O_3$, $La_2O_3$, $Gd_2O_3$, $Y_2O_3$, $TiO_2$, $Nb_2O_5$, $ZrO_2$ and ZnO is above 99%.

11. The optical glass according to claim 1, wherein the content of each component satisfies one or more of the following 5 conditions:
1) $SiO_2/B_2O_3$ is 0.3-1;
2) $ZnO/B_2O_3$ is 0.5-2;
3) $TiO_2/(TiO_2+Nb_2O_5)$ is 0.1-0.9;
4) $Gd_2O_3/(La_2O_3+Gd_2O_3+Y_2O_3)$ is 0.15-0.6; and
5) $4 \times ZrO_2/(ZnO+Li_2O)$ is 0.3-1.6.

12. The optical glass according to claim 1, wherein the content of each component satisfies one or more of the following 7 conditions:
1) $SiO_2/B_2O_3$ is 0.3-0.7;
2) $Nb_2O_5/Gd_2O_3$ is 0.03-0.8;
3) $Ta_2O_5/Nb_2O_5$: less than 0.8;
4) $ZnO/B_2O_3$ is 0.7-1.5;
5) $TiO_2/(TiO_2+Nb_2O_5)$ is 0.2-0.8;
6) $Gd_2O_3/(La_2O_3+Gd_2O_3+Y_2O_3)$ is 0.2-0.55;
7) $4 \times ZrO_2/(ZnO+Li_2O)$ is 0.35-1.2.

13. The optical glass according to claim 1, wherein the content of each component satisfies one or more of the following 7 conditions:
1) $SiO_2/B_2O_3$ is 0.35-0.65;
2) $Nb_2O_5/Gd_2O_3$ is 0.05-0.5;
3) $Ta_2O_5/Nb_2O_5$: less than 0.5;
4) $ZnO/B_2O_3$ is 0.75-1.2;
5) $TiO_2/(TiO_2+Nb_2O_5)$ is 0.3-0.7;
6) $Gd_2O_3/(La_2O_3+Gd_2O_3+Y_2O_3)$ is 0.25-0.5;
7) $4 \times ZrO_2/(ZnO+Li_2O)$ is 0.45-1.

14. The optical glass according to claim 1, wherein the refractive index of the glass is 1.77-1.85, the Abbe number is 40-48, and the density of the glass is below 5.00 g/cm$^3$.

15. The optical glass according to claim 1, wherein the corresponding wave length $\lambda_{80}$ is below 410 nm when the transmittance of the optical glass reaches 80%, the corresponding wave length $\lambda_5$ is below 350 nm when the transmittance reaches 5%, the upper limit of devitrification temperature is below 1160° C., and the glass transition temperature is below 630° C.

16. The optical glass according to claim 1, wherein the corresponding wave length $\lambda_{80}$ is below 400 nm when the transmittance of the optical glass reaches 80%, the corresponding wave length $\lambda_5$ is below 340 nm when the transmittance reaches 5%, the upper limit of devitrification temperature is below 1150° C., the glass transition temperature is below 620° C., and the density of the glass is below 4.90 g/cm$^3$.

17. A glass preform, made of the optical glass according to claim 1.

18. An optical element, made of the optical glass according to claim 1.

19. An optical glass, comprising the following components by mole percentage: 5-25% of $SiO_2$, 15-45% of $B_2O_3$, 5-25% of $La_2O_3$, 1-20% of $Gd_2O_3$, 0-10% of $Y_2O_3$, 0-8% of $TiO_2$, 0-8% of $Ta_2O_5$, more than 0 but less than or equal to 8% of $Nb_2O_5$, more than 0 but less than or equal to 15% of $ZrO_2$, 18-40% of ZnO, 0-10% of $WO_3$, 0-8% of $Li_2O$, 0-10% of $Al_2O_3$, 0-10% of $Yb_2O_3$, 0-10% of $Na_2O$, 0-10% of $K_2O$, 0-1% of $Sb_2O_3$, and 0-10% of RO (in which RO is one or more of MgO, CaO, SrO or BaO), wherein a ratio $SiO_2/B_2O_3$ is 0.28-1.2, a ratio of $Nb_2O_5/Gd_2O_3$ is 0.01-1, and a ratio of $Ta_2O_5/Nb_2O_5$ is less than 1.

* * * * *